Sept. 17, 1929.   O. G. STOLZ   1,728,190
VALVE STEM
Filed March 30, 1928
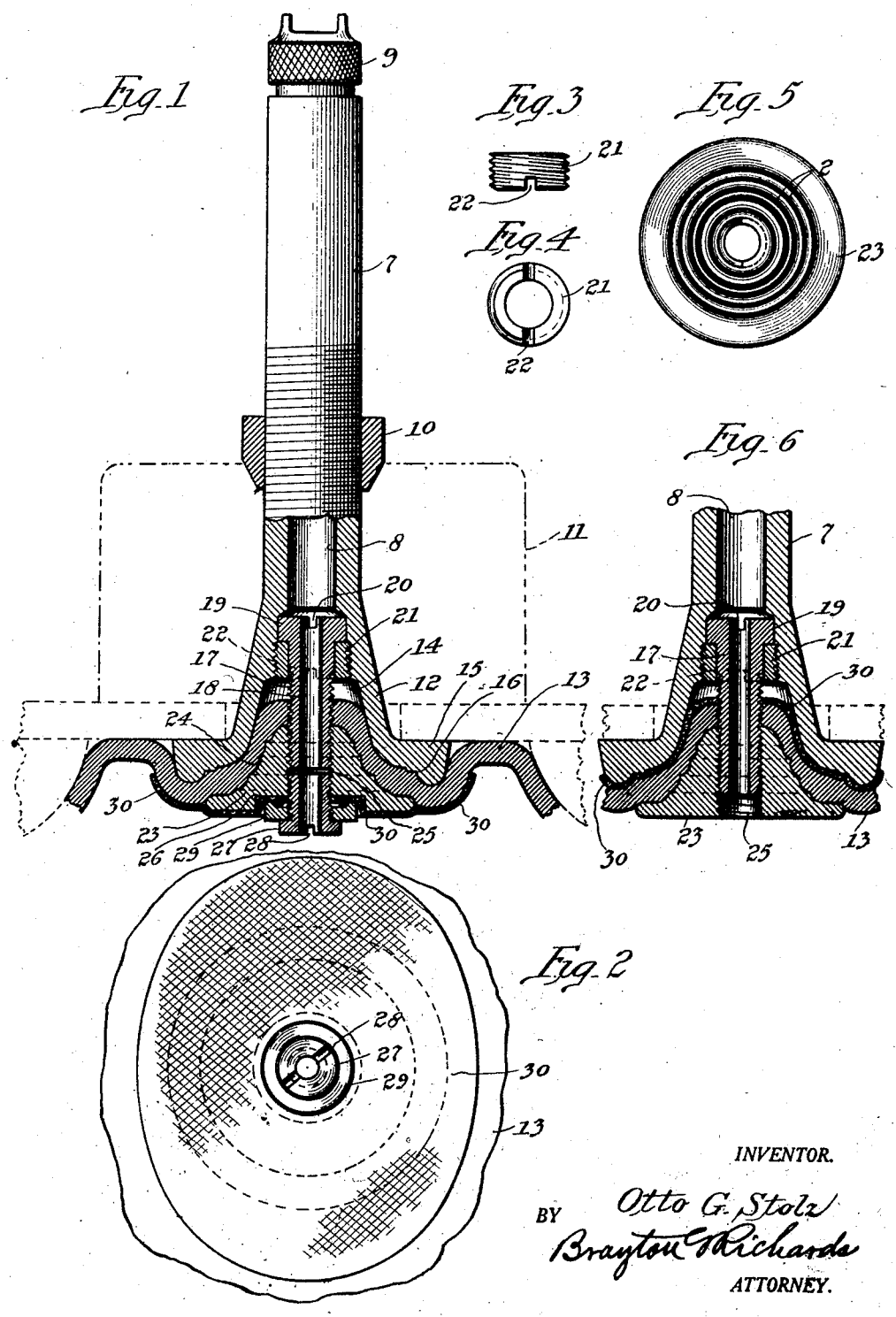
INVENTOR.
BY Otto G. Stolz
Brayton Richards
ATTORNEY.

Patented Sept. 17, 1929

1,728,190

UNITED STATES PATENT OFFICE

OTTO G. STOLZ, OF CHICAGO, ILLINOIS

VALVE STEM

Application filed March 30, 1928. Serial No. 265,965.

The invention relates to improvements in valve stems especially adapted for use in conjunction with automobile tires and the like, and has for its primary object the provision of an improved device of this character provided with improved means for securing the same to the inner tube of a pneumatic tire and the like.

Another object of the invention is the provision of a valve stem connection of the class indicated so constructed and arranged as to relieve the material of the tire tube largely from strain.

Other objects will appear hereinafter.

The invention consists in the combinations and arrangements of parts hereinafter described and claimed.

The invention will be best understood by reference to the accompanying drawings in which—

Fig. 1 is a partial longitudinal section through the secured end of a valve stem embodying the invention;

Fig. 2 is a bottom plan view of the same;

Fig. 3 is a detail view of a locking bushing employed in the construction;

Fig. 4 is a bottom plan view corresponding with Fig. 3;

Fig. 5 is a top plan view of a sealing member employed in the construction; and

Fig. 6 is a view illustrating a modified application of the construction to a tire tube.

The preferred form of construction as illustrated in the drawings comprises a valve stem 7 having the usual bore 8 for the passage of air and the usual sealing cap 9 for sealing the outer end thereof, there being, of course, the usual check valve, not shown, in said stem. This stem is equipped with the usual clamping nut 10 by which the same may be clamped to the usual felloe of the wheel as indicated.

The stem 7 is provided at its lower end with a clamping head 12 adapted to rest against the outside of the tire tube 13, said clamping head being provided with a central conical recess 14 and a lip or flange 15, the inner edges of said recess being beaded at 16 for the better clamping engagement with the tube 13. A threaded clamping sleeve 17 is swiveled in the stem 7 at the bottom of the recess 14, said sleeve 17 being provided with a central bore 18 for the free passage of air. The sleeve 17 is provided with a head 19 and notches 20 for the reception of a screw driver inserted through the bore 8 for manipulating said sleeve as a clamping screw. The sleeve 17 is held in place by means of a locking bushing 21 threaded in the bottom of the recess 14 by means of a left hand thread as shown and whereby tightening of the sleeve 17 will also tend to tighten the said bushing. The bushing 21 is equipped with notches 22 for engagement by a tool for removal and replacement of the same.

In assembling the parts, the sleeve 17 is first placed in the recess 14 as indicated, with the locking bushing 21 fitted thereover. Then, by means of a spanner wrench engaging the notches 22, the locking bushing 21 is engaged by means of its threads and tightened into position as shown, thereby permanently holding the sleeve 17 in swiveled engagement with the inner end of the valve stem but protruding inwardly from the effective inner end of said valve stem.

A sealing member or head 23 substantially conical in form to fit into the recess 14 as shown is provided with beads 24 to increase its clamping action. The sealing member 23 is provided with a central threaded bore 25 adapted to receive the threaded sleeve 17 and be drawn into the recess 14 to clamp the edges of the tire tube 13 therein as indicated.

At its inner end the sealing member 23 is provided with a central clamping recess 26, and a second headed clamping sleeve 27 is arranged to engage the bore 25 and is provided with notches 28 for the reception of a screw driver. A clamping washer 29 is arranged to enter the recess 26 and serves as a means for clamping a reinforcing piece 30 therein. The reinforcing piece 30 is of canvas or other suitable non-elastic material adapted to prevent stretching and withdrawing. It is impregnated with rubber compound or other suitable adhesive and is permanently vulcanized or otherwise secured to the inner side of the tube 13, being also detachably secured to the sealing member 23 by means of the clamping washer 29 and clamping sleeve 27 as explained above.

In the course of manufacture of the inner tube 13, the sealing head 23 is permanently incorporated therewith by permanently securing the reinforcing piece 30 thereto, by vulcanization or otherwise. When it is desired to associate the valve stem 7 therewith, the sleeve 17 is engaged with the threads in the bore of the sealing member 23. Then, by inserting a screw driver through the bore 8 of the valve stem 7 and engaging the said screw driver with the notches 20 in the head 19 of the sleeve 17, said sleeve is tightened in position as indicated, thereby securely clamping the inner tube 13 between the sealing member 23 and the walls of the recess 14.

By this arrangement a practically permanent connection is effected with the inner tube 13 of an automobile tire and all leakage prevented. The reinforcing action of the fabric piece 30 so distributes the strain of the connection with the valve stem as to obviate any danger of the stem tearing loose from the tube or of causing an opening or tear in the tube and consequent leakage.

The arrangement is such also that the inner tube rests substantially flat on the tire rim and creasing and consequent cracking of the tube is thereby avoided.

The arrangement illustrated in Fig. 6 is especially adapted for use in conjunction with used tire tubes and facilitates the replacement of old and defective valve stems by a valve stem of my improved construction as outlined above. In such a case the usual opening in the tire tube is first reinforced by means of the piece or patch 30, the same being preferably vulcanized in place immediately surrounding the usual opening in the tube 13 after the sealing or clamping head 23 has been forced through said opening. If the forcing of the sealing member 23 through the opening causes any tearing thereof, the vulcanization of the fabric piece 30 around said opening will mend and secure such tear against leakage. Then the valve stem 7 is clamped in place as before by means of the clamping sleeve 17 and a tight and secure connection thus effected with the tire tube.

While I have illustrated and described the preferred form of construction for carrying my invention into effect, this is capable of variation and modification without departing from the spirit of the invention. I therefore do not wish to be limited to the precise details set forth but desire to avail myself of such variations and modifications as fall within the scope of the appended claims.

I claim:

1. A valve stem provided with a head adapted to rest against the outside of a container; a sealing member adapted to be inserted in an opening in said container and compress the edges of the opening against said head; and a non-elastic reinforcing piece secured to said member and to the inner side of said container.

2. A valve stem provided with a head adapted to rest against the outside of a container, said head being provided with a conical recess; a conical sealing member adapted to be inserted in an opening in said container and compress the edges of said opening against the sides of said recess; means for drawing said member against the sides of said recess; and a non-elastic reinforcing piece secured to said member and to the inner side of said container.

3. A valve stem provided with a head adapted to rest against the outside of a container; a sealing member adapted to be inserted in an opening in said container and compress the edges of the opening against said head; and a non-elastic reinforcing piece detachably secured to said member and permanently secured to the inner side of said container.

4. A valve stem provided with a head adapted to rest against the outside of a container, said head being provided with a conical recess; a conical sealing member adapted to be inserted in an opening in said container and compress the edges of said opening against the sides of said recess; means for drawing said member against the sides of said recess; and a non-elastic reinforcing piece detachably secured to said member and permanently secured to the inner side of said container.

5. A valve stem provided with a head adapted to rest against the outside of a container; a sealing member adapted to be inserted in an opening in said container and compress the edges of the opening against said head; a threaded connection between said member and said stem for manipulating the latter; and a non-elastic reinforcing piece secured to said member and to the inner side of said container.

6. A valve stem provided with a head adapted to rest against the outside of a container, said head being provided with a conical recess; a conical sealing member adapted to be inserted in an opening in said container and compress the edges of said opening against the sides of said recess; a threaded connection between said member and said stem for drawing said member against the sides of said recess; and a non-elastic reinforcing piece secured to said member and to the inner side of said container.

7. A valve stem provided with a head adapted to rest against the outside of a tire tube or the like, said head being provided with a conical recess; a threaded sleeve swiveled in and protruding from the inner end of said stem and adapted to be manipulated through the bore thereof; and a conical sealing member arranged to compress the edges of said tube against the sides of said recess, said sealing member being provided with a central threaded bore to receive said threaded sleeve.

8. A valve stem provided with a head adapted to rest against the outside of a tire tube or the like, said head being provided with a conical recess; a threaded sleeve swiveled in said stem and adapted to be manipulated through the bore thereof; a conical sealing member arranged to compress the edges of said tube against the sides of said recess, said sealing member being provided with a central threaded bore to receive said threaded sleeve; and a non-elastic reinforcing piece secured to said member and to the inner side of said tube.

9. A valve stem provided with a head adapted to rest against the outside of a tire tube or the like, said head being provided with a conical recess, the sides of said recess being beaded; a conical sealing member arranged to enter said recess and compress the edges of the tire opening against the sides thereof, the sides of said member being beaded, there being a central threaded bore through said member; a headed sleeve swiveled in and protruding from the bottom of said recess and provided with notches for engagement by a screw driver inserted through the bore of said stem; and a bushing threaded in said stem at the bottom of said recess to hold said sleeve in place.

10. A valve stem provided with a head adapted to rest against the outside of a tire tube or the like, said head being provided with a conical recess, the sides of said recess being beaded; a conical sealing member arranged to enter said recess and compress the edges of the tire opening against the sides thereof, the sides of said member being beaded, there being a central threaded bore through said member; a headed sleeve swiveled in the bottom of said recess and provided with notches for engagement by a screw driver inserted through the bore of said stem; a bushing threaded in said stem at the bottom of said recess to hold said sleeve in place; a non-elastic reinforcing piece permanently secured to the inner side of said tube and resting over the inner end of said sealing member, there being a central clamping recess in the end of said sealing member; a clamping washer arranged to enter said last mentioned recess to clamp said reinforcing piece; and a threaded clamping sleeve engaging the bore in said sealing member and forcing said clamping washer into its recess.

11. A valve stem provided with a head adapted to rest against the outside of a tire tube or the like, a threaded sleeve swiveled in and protruding from the inner end of said stem and adapted to be manipulated through the bore thereof; and a sealing member arranged to compress the edges of said tube against said head, said sealing member being provided with a central threaded bore to receive said threaded sleeve.

12. A valve stem provided with a head adapted to rest against the outside of a tire tube or the like, a threaded sleeve swiveled in and protruding from the inner end of said stem and adapted to be manipulated through the bore thereof; a sealing member arranged to compress the edges of said tube against said head, said sealing member being provided with a central threaded bore to receive said threaded sleeve; and a non-elastic reinforcing piece secured to said member and to the inner side of said tube.

In witness that I claim the foregoing as my invention, I affix my signature this 27th day of March, A. D. 1928.

OTTO G. STOLZ.